(12) United States Patent
Saisho et al.

(10) Patent No.: US 12,197,540 B2
(45) Date of Patent: Jan. 14, 2025

(54) LEARNING METHOD, DEVICE, LEARNING APPARATUS AND PROGRAM

(71) Applicant: Nippon Telegraph and Telephone Corporation, Tokyo (JP)

(72) Inventors: Osamu Saisho, Musashino (JP); Keiichiro Kashiwagi, Musashino (JP); Yui Saito, Musashino (JP); Tomoyuki Fujino, Musashino (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 203 days.

(21) Appl. No.: 17/908,607

(22) PCT Filed: Mar. 2, 2020

(86) PCT No.: PCT/JP2020/008719
§ 371 (c)(1),
(2) Date: Sep. 1, 2022

(87) PCT Pub. No.: WO2021/176529
PCT Pub. Date: Sep. 10, 2021

(65) Prior Publication Data
US 2023/0118209 A1   Apr. 20, 2023

(51) Int. Cl.
*G06F 16/00* (2019.01)
*G06F 18/23211* (2023.01)
*G06N 3/047* (2023.01)

(52) U.S. Cl.
CPC ....... *G06F 18/23211* (2023.01); *G06N 3/047* (2023.01)

(58) Field of Classification Search
None
See application file for complete search history.

(56) References Cited

U.S. PATENT DOCUMENTS

2015/0142322 A1   5/2015  Okamoto et al.

FOREIGN PATENT DOCUMENTS

| JP | 2015099468 | | 5/2015 |
| JP | 2017167834 | | 9/2017 |
| KR | 102314219 | B1 * | 4/2019 |

OTHER PUBLICATIONS

Chen et al., "Distributed Active Learning with Application to Battery Health Management," 14th International Conference on Information, Chicago, Illinois, Fusion, Jul. 2011, pp. 1431-1437.

* cited by examiner

*Primary Examiner* — Tuankhanh D Phan
(74) *Attorney, Agent, or Firm* — Fish & Richardson P.C.

(57) ABSTRACT

A learning method includes a step in which a device acquires a plurality of samples, a step in which the device divides the plurality of samples into a plurality of clusters, a step in which the device extracts samples from each of the plurality of clusters according to an effectiveness of each cluster received from a learning apparatus, a step in which the device transmits the extracted samples to the learning apparatus, a step in which the learning apparatus learns the extracted samples, a step in which the learning apparatus calculates, for each cluster, an effectiveness in learning the samples belonging to a cluster from learning results, and a step in which the learning apparatus transmits the effectiveness of each cluster to the device.

14 Claims, 14 Drawing Sheets

(a)

(b)

SAMPLE

LEARNING METHOD, DEVICE, LEARNING APPARATUS AND PROGRAM

CROSS-REFERENCE TO RELATED APPLICATIONS

This application is a National Stage application under 35 U.S.C. § 371 of International Application No. PCT/JP2020/008719, having an International Filing Date of Mar. 2, 2020.

The disclosure of the prior application is considered part of the disclosure of this application, and is incorporated by reference in its entirety into this application.

TECHNICAL FIELD

The present disclosure relates to a learning method, a device, a learning apparatus, and a program.

BACKGROUND ART

In general, there are technologies in which sensors are disposed at various locations and situations are grasped from signals of the sensors. There is a method in which biological signals such as cardiac potential or myoelectric potential are acquired and learned to grasp health conditions and use it for preventive medicine or follow-up observation after illness, for example. In addition, there is a method of grasping condition of a device from values of sensors provided in the device and using the values for prediction of failure of the device or the like.

Samples acquired by such sensors may be transmitted to a learning apparatus by the devices equipped with the sensors, and the samples may be learned by the learning apparatus.

There is also a learning system in which data is collectively managed by a data server and a plurality of learning apparatuses access the data server (see NPL 1).

CITATION LIST

Non Patent Literature

NPL 1: Huimin Chen et al., "Distributed Active Learning with Application to Battery Health Management", 14th International Conference on Information Fusion Chicago, Illinois, USA, Jul. 5-8, 2011

SUMMARY OF THE INVENTION

Technical Problem

The sensors may acquire data at hundreds to thousands of Hz per location, and the number of samples acquired by the sensors is enormous. Transmitting all of these samples to the learning apparatus may cause problems such as communication band constraints between the devices and the learning apparatus, or consumption of power of the devices.

The present disclosure is devised in view of the above circumstances, and an object of the present disclosure is to provide a technique for appropriately selecting samples to be transmitted from a device to a learning apparatus.

Means for Solving the Problem

A learning method according to an aspect of the present disclosure includes acquiring, by a device, a plurality of samples, dividing, by the device, the plurality of samples into a plurality of clusters, extracting, by the device, samples from each of the plurality of clusters according to an effectiveness of each of the plurality of clusters received from a learning apparatus, transmitting, by the device, the extracted samples to the learning apparatus, learning, by the learning apparatus, the extracted samples, calculating, by the learning apparatus, for each of the plurality of clusters, an effectiveness in learning samples of the extracted samples belonging to a cluster of the plurality of clusters from learning results, and transmitting, by the learning apparatus, the effectiveness of each of the plurality of clusters to the device.

A learning system of an aspect of the present disclosure includes a device and a learning apparatus connected to the device, in which the device includes an acquisition unit that acquires a plurality of samples, a clustering unit that divides the plurality of samples into a plurality of clusters, an extraction unit that extracts samples from each of the plurality of clusters according to a ratio of an effectiveness of each of the plurality of clusters received from the learning apparatus, and a transmission unit that transmits the extracted samples to the learning apparatus, and the learning apparatus includes a learning unit that learns the extracted samples, an effectiveness calculation unit that calculates, for each of the plurality of clusters, an effectiveness in learning samples of the extracted samples belonging to a cluster of the plurality of clusters from learning results, and a transmission unit that transmits the effectiveness of each of the plurality of clusters to the device.

A device of an aspect of the present disclosure is used for a learning system including the device and a learning apparatus connected to the device and includes an acquisition unit that acquires a plurality of samples, a clustering unit that divides the plurality of samples into a plurality of clusters, an extraction unit that extracts samples from each of the plurality of clusters according to a ratio of an effectiveness of each of the plurality of clusters received from the learning apparatus, and a transmission unit that transmits the extracted samples to the learning apparatus.

A learning apparatus of an aspect of the present disclosure is used for a learning system including a device and the learning apparatus connected to the device and includes a learning unit that learns samples extracted by the device, an effectiveness calculation unit that calculates, per clusters basis which are obtained by clustering the samples by the device, an effectiveness in learning the samples belonging to a cluster of the clusters from learning results, and a transmission unit that transmits the effectiveness of each of the clusters to the device.

An aspect of the present disclosure is a program for causing a computer to operate as the device described above.

An aspect of the present disclosure is a program for causing a computer to operate as the learning apparatus described above.

Effects of the Invention

According to the present disclosure, it is possible to provide a technique for appropriately selecting samples to be transmitted from a device to a learning apparatus.

DESCRIPTION OF EMBODIMENTS

Figure 1:
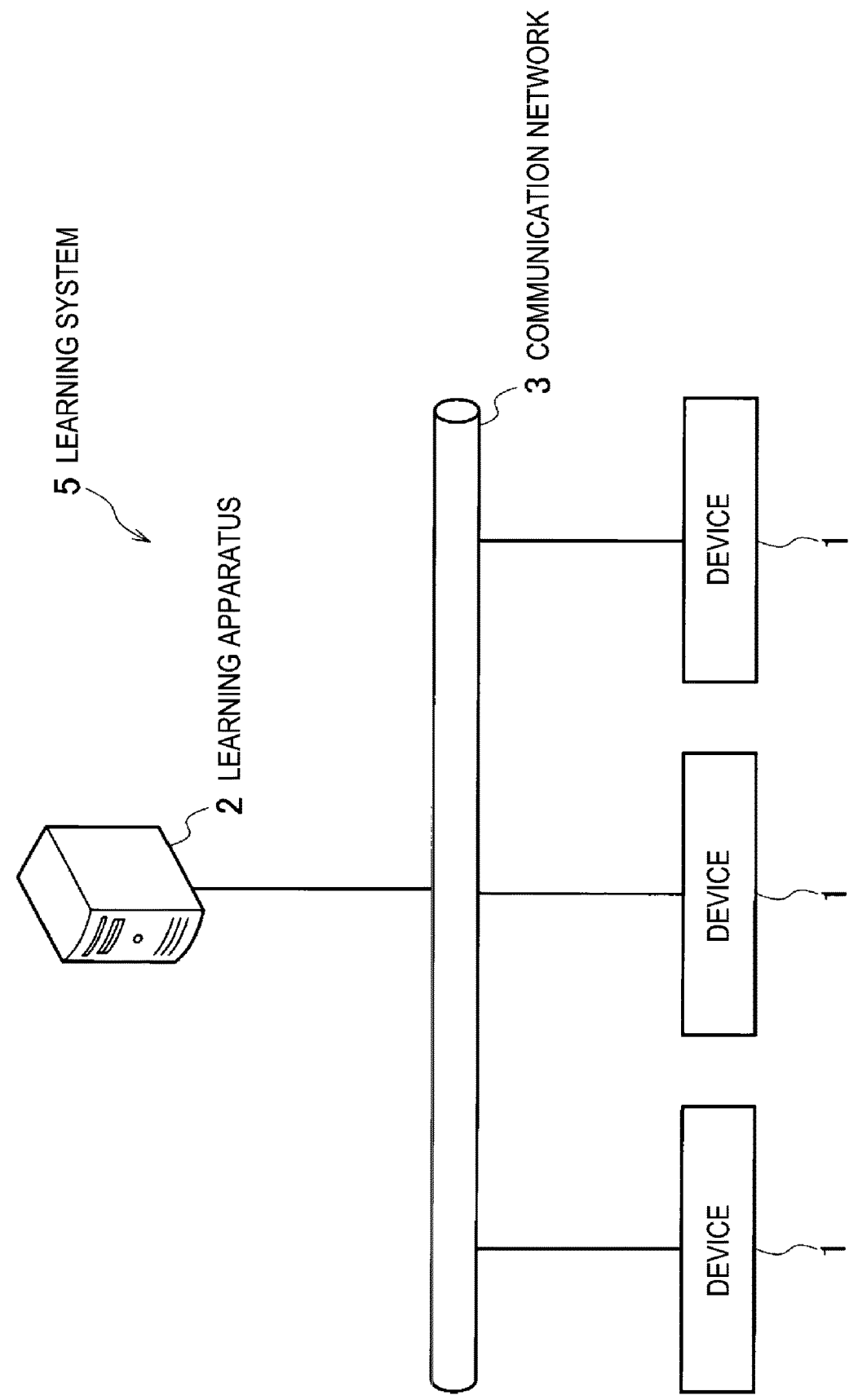
FIG. 1 is a system configuration diagram of a learning system according to an embodiment of the present disclosure.

Hereinafter, an embodiment of the present disclosure will be described with reference to the drawings. Note that the same portions in the description of the drawings will be denoted by the same reference numerals and signs, and the description thereof will be omitted.

Learning System

With reference to FIG. 1, a learning system 5 according to an embodiment of the present disclosure will be described. The learning system 5 includes a plurality of devices 1 and a learning apparatus 2. Both of the plurality of devices 1 and the learning apparatus are communicably connected to each other via various communication networks 3 such as the Internet, mobile communication, near field communication, or satellite communication.

Each of the devices 1 transmits, to the learning apparatus 2, samples extracted by means of a predetermined calculation method among samples acquired from a sensor. Though the learning system 5 illustrated in FIG. 1 includes three devices 1, the number of devices 1 is not limited. Though the embodiment of the present disclosure illustrates a case where one device 1 acquires samples from one sensor and transmits the samples to the learning apparatus 2, the present disclosure is not limited thereto. As another example, a device 1 may acquire samples from a plurality of sensors, extract samples to be transmitted to a learning apparatus 2 from the samples acquired from the sensors, and transmit the extracted samples to the learning apparatus 2.

The learning apparatus 2 learns samples acquired from one or more devices 1 to form a learning model. The learning apparatus 2 is a computer connected to the one or more devices 1, and may be, for example, a computer provided in a cloud, or a fog node. The learning apparatus 2 is a so-called classifier, but the details of the classifier are not limited. In a case where the samples relate to electrocardiogram (ECG), the learning apparatus 2 analyzes arrhythmia (see AAMI EC57). In a case where the samples relate to electromyography (EMG), the learning apparatus 2 analyzes quality of skills in sport operations.

The learning apparatus 2 also calculates an effectiveness for each sample in learning and converts the calculated effectiveness into an effectiveness for each cluster generated by the device to feedback the effectiveness for each cluster to the device 1. The device 1 refers to the effectiveness provided from the learning apparatus 2 and extracts, from among the samples acquired by the sensor, samples to be transmitted to the learning apparatus 2.

In addition, the learning apparatus 2 calculates a ratio $\varepsilon$, which is a ratio used by the device 1 for extracting the samples, and transmits the calculated ratio $\varepsilon$ to the device 1. This ratio $\varepsilon$ is a ratio of the number of samples selected to achieve enhancement of learning efficiency in the learning apparatus 2 to the number of samples transmitted to the learning apparatus 2. Samples of a ratio 1-$\varepsilon$ of the total number of samples transmitted to the learning apparatus 2, are extracted such that a distribution of the samples collected by the device and a distribution of the samples transmitted to the learning apparatus 2 have the same tendency.

In the embodiment of the present disclosure, one cycle is defined as a cycle in which the device 1 acquires samples and transmits the acquired samples to the learning apparatus 2, and then the learning apparatus 2 learns the samples and feeds back the effectiveness. The learning system 5 reflects learning results by the learning apparatus 2 in a previous cycle on sample extraction by the device 1 in a next cycle to properly extract samples that are effective for learning.

Figure 2:
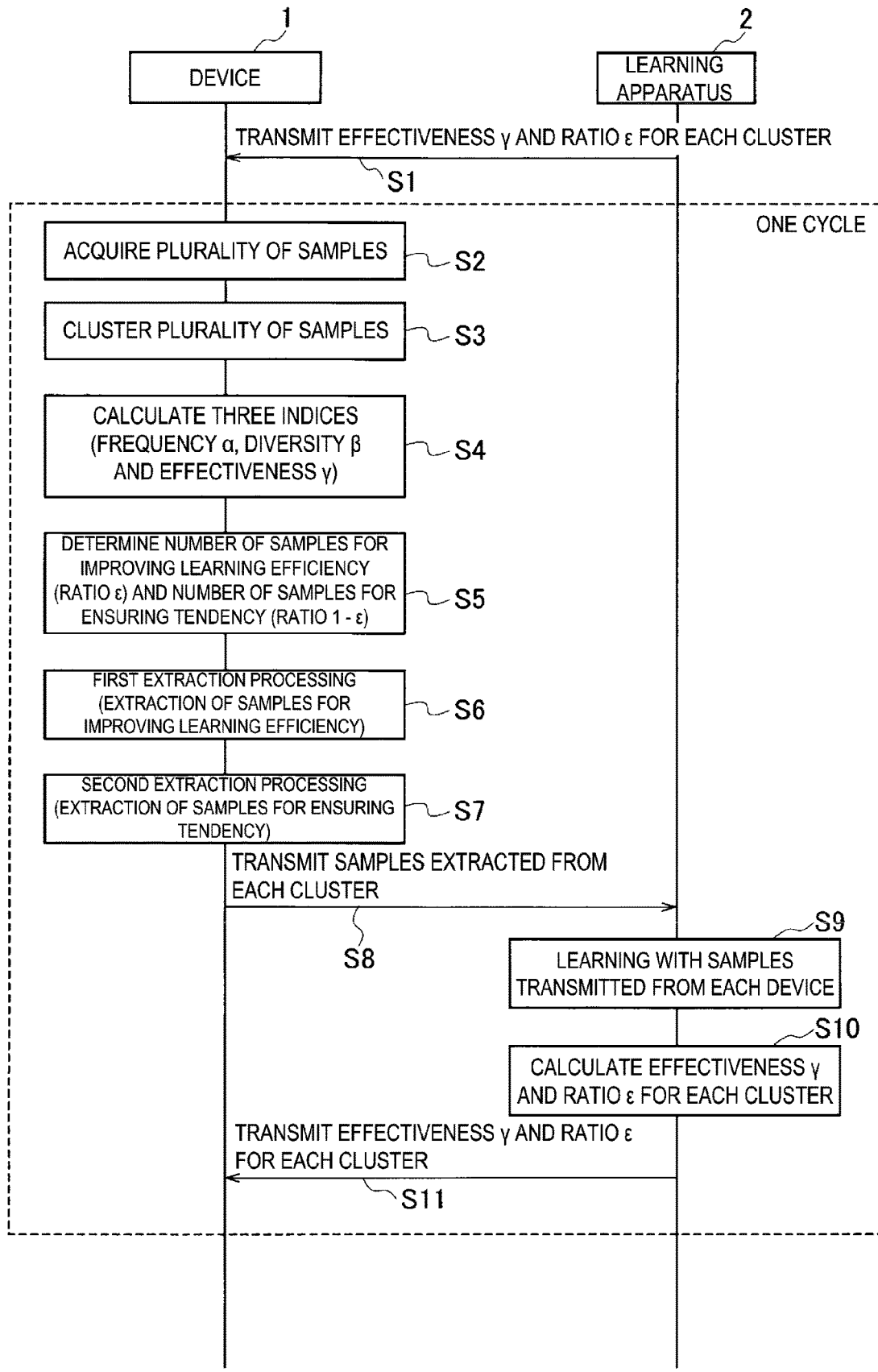
FIG. 2 is a sequence diagram of a learning method according to the embodiment of the present disclosure.

With reference to FIG. 2, a learning method in the learning system 5 according to the embodiment of the present disclosure will be described. One cycle is defined as a cycle from Step S2 of acquiring a plurality of samples to Step S11 in which the learning apparatus 2 transmits an effectiveness for each cluster to the device 1. The learning system 5 performs learning by repeating the one cycle multiple times.

First, at Step S1, the learning apparatus 2 transmits, to the device 1, an effectiveness of each cluster and a ratio $\varepsilon$. The effectiveness is calculated for each cycle and cluster, and ratio $\varepsilon$ is calculated for each cycle. The effectiveness of each cluster and the ratio $\varepsilon$ are calculated from samples transmitted by the device 1 in the previous cycle. The effectiveness of each cluster and the ratio $\varepsilon 0$ calculated in the previous cycle are referenced in a current cycle at or after Step S2.

With reference to Step S2 to Step S11, processing operations in the current cycle according to the embodiment of the present disclosure will be described.

At Step S2, the device 1 acquires a plurality of samples. In a case where a sensor output acquired by the device 1 is a time-series signal, the device 1 divides the signal into a plurality of samples. At Step S3, the device 1 divides the plurality of samples acquired at Step S2 into a plurality of clusters.

At Step S4, the device 1 calculates, from the plurality of samples acquired at Step S2, three indices used to extract samples to be transmitted to the learning apparatus 2. The three indices are frequency $\alpha$, diversity $\beta$, and effectiveness $\gamma$. Frequency $\alpha$ and effectiveness $\gamma$ are calculated for each cluster. Frequency $\alpha$ and effectiveness $\gamma$ are indices for determining a ratio of the number of samples to be extracted from a cluster and transmitted to the learning apparatus 2. Diversity $\beta$ is calculated for each sample. Diversity $\beta$ is an index of a weight for selecting samples to be transmitted from a cluster to the learning apparatus 2.

At Step S5, the device 1 determines the number of samples for enhancing learning efficiency and the number of samples for ensuring tendency. The ratio of the number of samples for enhancing learning efficiency to the number of samples for ensuring tendency is $\varepsilon:1-\varepsilon$.

At Step S6, the device 1 extracts, in first sampling processing, samples for enhancing learning efficiency from each cluster. The number of samples extracted here is a number obtained by multiplying the number of samples to be transmitted to the learning apparatus 2 by ratio $\varepsilon$.

At Step S7, the device 1 extracts, in second sampling processing, samples for ensuring tendency from each cluster. The number of samples extracted here is a number obtained by multiplying the number of samples to be transmitted to the learning apparatus 2 by ratio $1-\varepsilon$.

At Step S8, the device 1 transmits the samples extracted from each cluster at Steps S6 and S7 to the learning apparatus 2.

At Step S9, the learning apparatus 2 performs learning using the samples acquired at Step S8. At Step S10, the learning apparatus 2 calculates an effectiveness $\gamma$ for each cluster and further calculates a ratio $\varepsilon$. At Step S11, the learning apparatus 2 transmits the effectiveness $\gamma$ of each cluster and the ratio $\varepsilon$ calculated at Step S10 to the device 1.

Note that the effectiveness $\gamma$ of each cluster and the ratio $\varepsilon$ transmitted at Step S11 are referenced when samples are extracted in a next cycle.

Device

Figure 3:
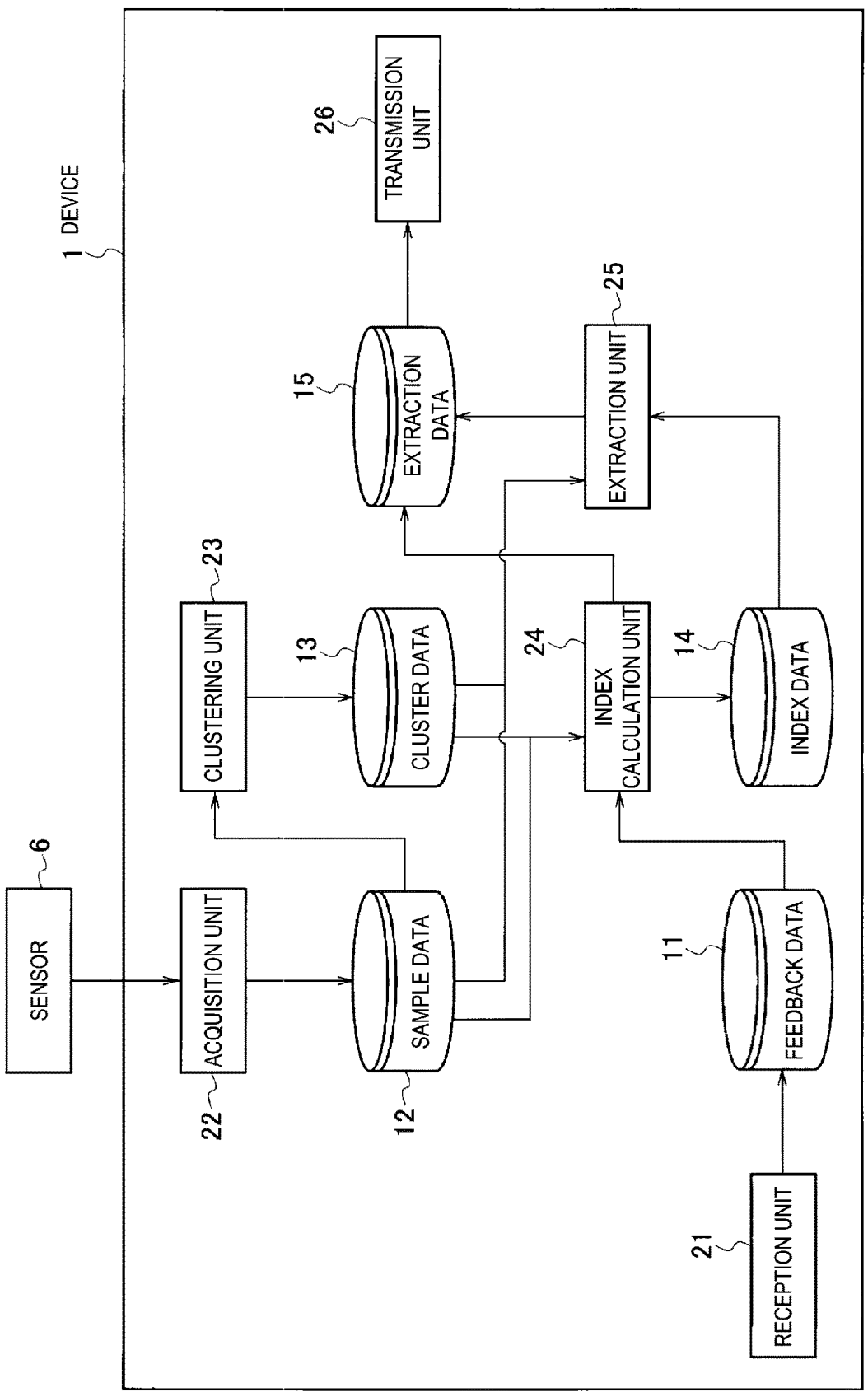
FIG. 3 is a functional block diagram of a device used in the learning system.

With reference to FIG. 3, the device 1 according to the embodiment of the present disclosure will be described. The device 1 stores feedback data 11, sample data 12, cluster data 13, index data 14, and extraction data 15. The device 1 includes a reception unit 21, an acquisition unit 22, a clustering unit 23, an index calculation unit 24, an extraction unit 25, and a transmission unit 26. The functions illustrated in FIG. 3 are implemented by a computer executing a program for executing processing operations.

The reception unit 21 acquires the feedback data 11 from the learning apparatus 2. The feedback data 11 includes an effectiveness of each cluster and a ratio $\varepsilon$. The effectiveness of each cluster and the ratio $\varepsilon$ received by the reception unit 21 from the learning apparatus 2 are calculated from samples in the previous cycle.

The acquisition unit 22 acquires a plurality of samples from a sensor 6, for example. The samples are single-cycle signals detected by the sensor 6. When the sensor 6 continuously detects a motion of a plurality of cycles, the acquisition unit 22 converts a continuous signal into a set of single-cycle signals.

Figure 4:
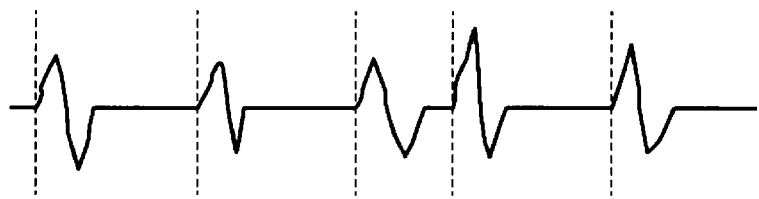
FIG. 4 is a diagram illustrating an acquisition unit of the device.
Figure 4:
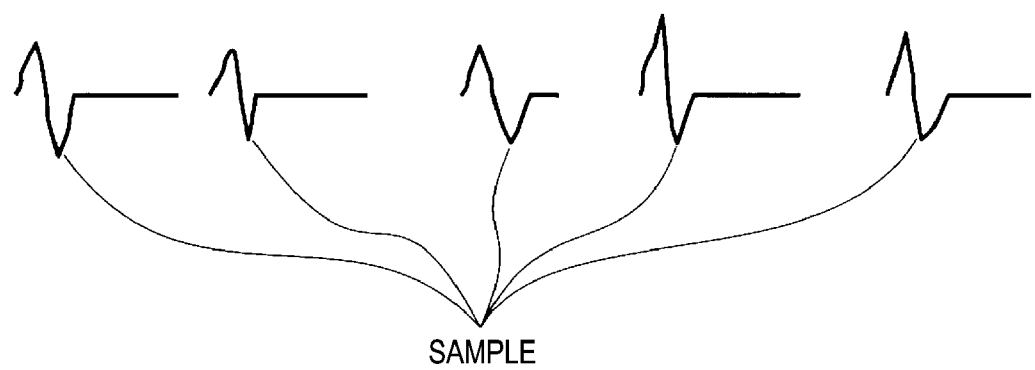

When the sensor 6 inputs a time-series signal as illustrated in FIG. 4(a) to the device 1, the acquisition unit 22 sets time windows for the input time-series signal, performs noise removal and normalization of data for each window, and acquires samples which are signals of a single-cycle motion as illustrated in FIG. 4(b).

Here, a size of the time window depends on the location where the sensor is installed. The time window is, for example, 4 seconds, 10 seconds, 1 minute, or the like in which a certain degree of consistency of movement in an exercise is observed. In a case where the sensor measures cardiac potential, due to QRS complex (R wave) detection by threshold processing, a length of a time window will be a duration of one heartbeat with the R wave as a reference.

In a case where the sensor measures myoelectric potential, due to onset detection by threshold processing or by dynamic threshold processing, a length of a time window will be a duration of one cycle in a periodic motion with an onset start time as a reference. In order to make lengths of the samples constant, a length of a sample for one heartbeat may be extended or reduced for adjustment.

The acquisition unit 22 stores the signal of each sample as the sample data 12. Here, the signal of each sample may be a waveform itself or may be a feature calculated from the waveform by predetermined processing.

The clustering unit 23 divides a plurality of samples identified in the sample data 12 into a plurality of clusters. Here, the clustering unit 23 divides the plurality of samples into a predetermined number of clusters. The clustering unit 23 generates the cluster data 13 that identifies samples belonging to each cluster. In the cluster data 13, for example, an identifier of a cluster is associated with an identifier of a sample belonging to the cluster.

The clustering unit 23 classifies the plurality of samples into the plurality of clusters using a common clustering method such as K-shape or shapelet discovery.

Figure 5:
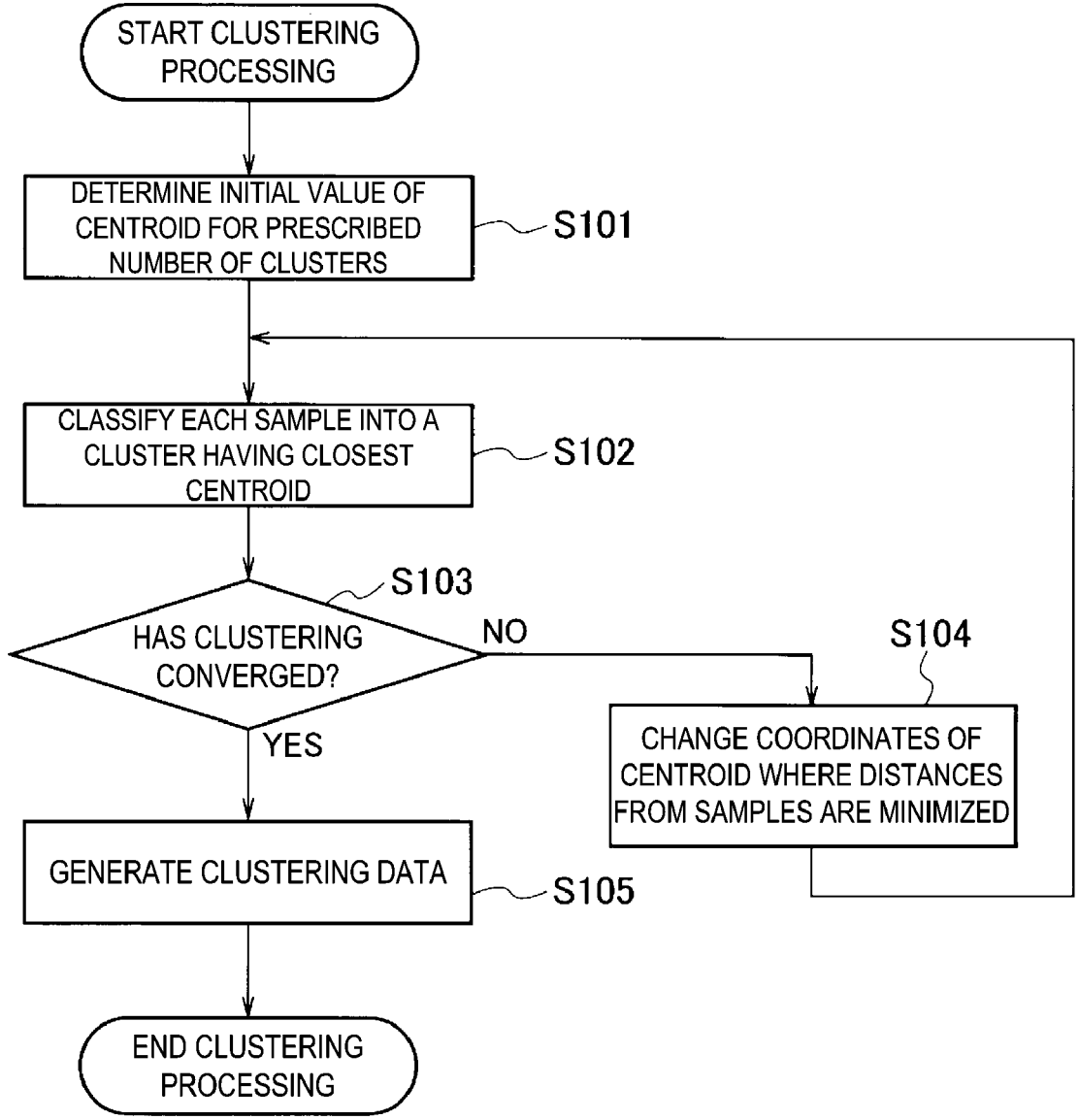
FIG. 5 is a flowchart illustrating clustering processing by a clustering unit of the device.

With reference to FIG. 5, clustering processing performed by the clustering unit 23 will be described.

First, at Step S101, the clustering unit 23 determines an initial value of centroid for a prescribed number of clusters. In the first cycle where device 1 first performs clustering, a centroid is determined by a random number. In the second and subsequent cycles, a centroid in a previous cycle is set as the initial value of a centroid in a current cycle.

At Step S102, the clustering unit 23 classifies each sample into a cluster having a closest centroid. Here, it is assumed that each sample belongs to the cluster having the closest centroid.

At Step S103, whether the clustering has converged is determined. For example, if a sum of the distances between samples and a centroid of the cluster to which the samples belong converges, the clustering is determined to converge. The distances are calculated by means of shape-based distance (SBD), dynamic time warping (DTW), or the like, for example. Alternatively, if a centroid calculated from each sample belonging to a cluster coincides with the centroid serving as a criterion of classification at Step S102, the clustering is determined to converge.

If the clustering is determined not to converge, then a new centroid is calculated at Step S104 and the processing of Step S102 is repeated. The clustering unit 23 changes, according to the classification at Step S102, coordinates of the centroid of the cluster to the location where the sum of the distances from the locations of the samples belonging to the cluster is minimized. At Step S102, the clustering unit 23 calculates a centroid for each cluster.

When determining that the clustering has converged, the clustering unit 23 generates the cluster data 13 at Step S105 and ends the processing.

The index calculation unit 24 calculates indices to be referenced when the extraction unit 25 extracts samples to be transmitted to the learning apparatus 2 from each cluster. The indices are the number of samples for enhancing learning efficiency and the number of samples for ensuring tendency, as well as frequency $\alpha$, diversity $\beta$, and effectiveness $\gamma$, which are indices when the extraction unit 25 extracts samples for enhancing learning efficiency from each cluster. The index calculation unit 24 generates the index data 14 including the calculated indices.

The index calculation unit 24 uses ratio $\varepsilon$ to calculate the number of samples for enhancing learning efficiency and the number of samples for ensuring tendency. The number of samples for enhancing learning efficiency is the total number of samples to be transmitted from the device 1 to the learning apparatus 2 multiplied by ε. The number of samples for ensuring tendency is the total number of samples to be transmitted from the device 1 to the learning apparatus 2 multiplied by (1-ε).

Note that in a case where ratio ε is not given from the learning apparatus 2, such as in the first cycle, the index calculation unit 24 uses an any ratio.

The index calculation unit 24 calculates frequency α and effectiveness γ for each cluster in order to determine the number to be extracted from each cluster.

Frequency α is a ratio of the number of samples belonging to a cluster to the total number of samples. For each cluster, the index calculation unit 24 counts the number of samples belonging to the cluster and divides the number of samples belonging to each cluster by the total number of samples to calculate frequency α for each cluster. As the number of samples belonging to a cluster increases, the frequency of the cluster becomes higher.

Effectiveness γ is an effectiveness in learning the samples in each cluster by the learning apparatus 2. Effectiveness γ is calculated from the effectiveness of each cluster in the previous cycle acquired by the reception unit 21.

The index calculation unit 24 may associate each cluster in a previous cycle with each cluster identified in a current cycle based on a centroid of each cluster. The index calculation unit 24 sets an effectiveness of a cluster in the previous cycle corresponding to a cluster identified in the current cycle as effectiveness γ of the cluster in the current cycle corresponding to the cluster in the previous cycle. In that case, samples are extracted from each of the plurality of clusters in the current cycle according to the effectiveness of each cluster in the previous cycle. For example, among centroids of clusters in the previous cycle, a cluster in the previous cycle having a centroid closest to a centroid of a cluster in the current cycle is identified as a cluster corresponding to the cluster in the current cycle. This calculation method is effective when similar clusters are formed in each cycle. Note that in a case where effectiveness of each cluster is not given from the learning apparatus 2, such as in the first cycle, an initial value of γ may be 0 or the like.

An effectiveness of each cluster to be transmitted from the learning apparatus 2 is an effectiveness of the cluster in a previous cycle. Therefore, effectiveness γ for each cluster in a current cycle may be calculated by correcting the effectiveness in the previous cycle to the effectiveness in the current cycle.

Figure 6:
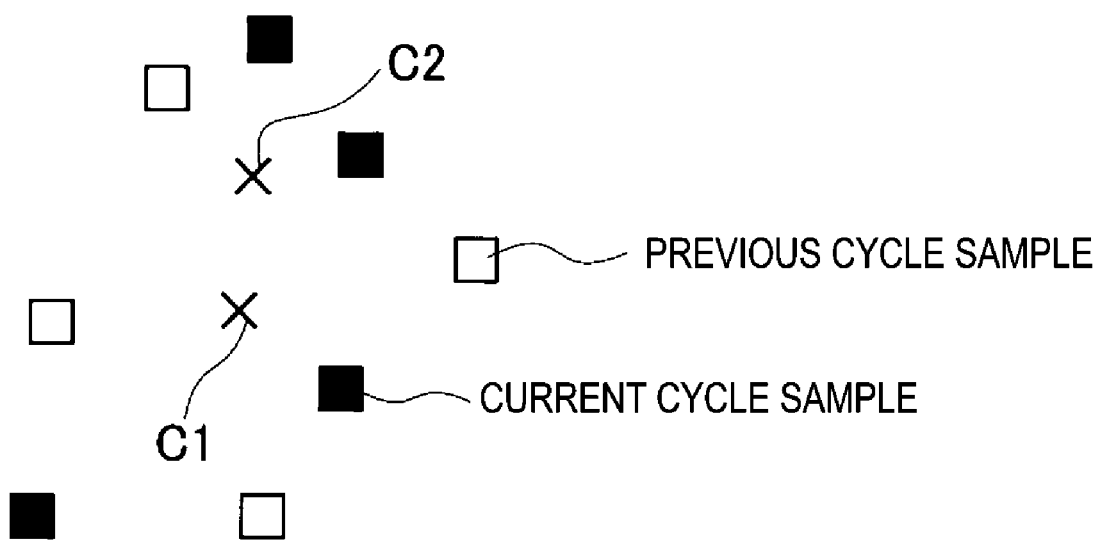
FIG. 6 is a diagram (part 1) illustrating a method for calculating an effectiveness in an index calculation unit of the device.

FIG. 6 illustrates a portion of samples of a cluster in a previous cycle and a cluster in a current cycle corresponding to the cluster in the previous cycle, for example. In FIG. 6, open squares are samples of a cluster in a previous cycle and solid squares are samples of a cluster in a current cycle. A centroid of the cluster in the current cycle is indicated by C1 and a centroid of the cluster in the previous cycle is indicated by C2. Thus, even in two corresponding clusters in two cycles, the positions of the centroids are different. The index calculation unit 24 then corrects the effectiveness of the cluster in the previous cycle according to the distance between the centroid of the cluster in the previous cycle and the centroid of the cluster in the current cycle corresponding to the cluster in the previous cycle and calculates the effectiveness of the cluster in the current cycle corresponding to the cluster in the previous cycle. For example, the effectiveness of the cluster in the current cycle corresponding to the cluster in the previous cycle is calculated such that as the distance between the centroid of the cluster in the previous cycle and the centroid of the cluster in the current cycle corresponding to the cluster in the previous cycle increases, the effectiveness of the cluster in the current cycle becomes lower than the effectiveness of the cluster in the previous cycle.

Figure 7:
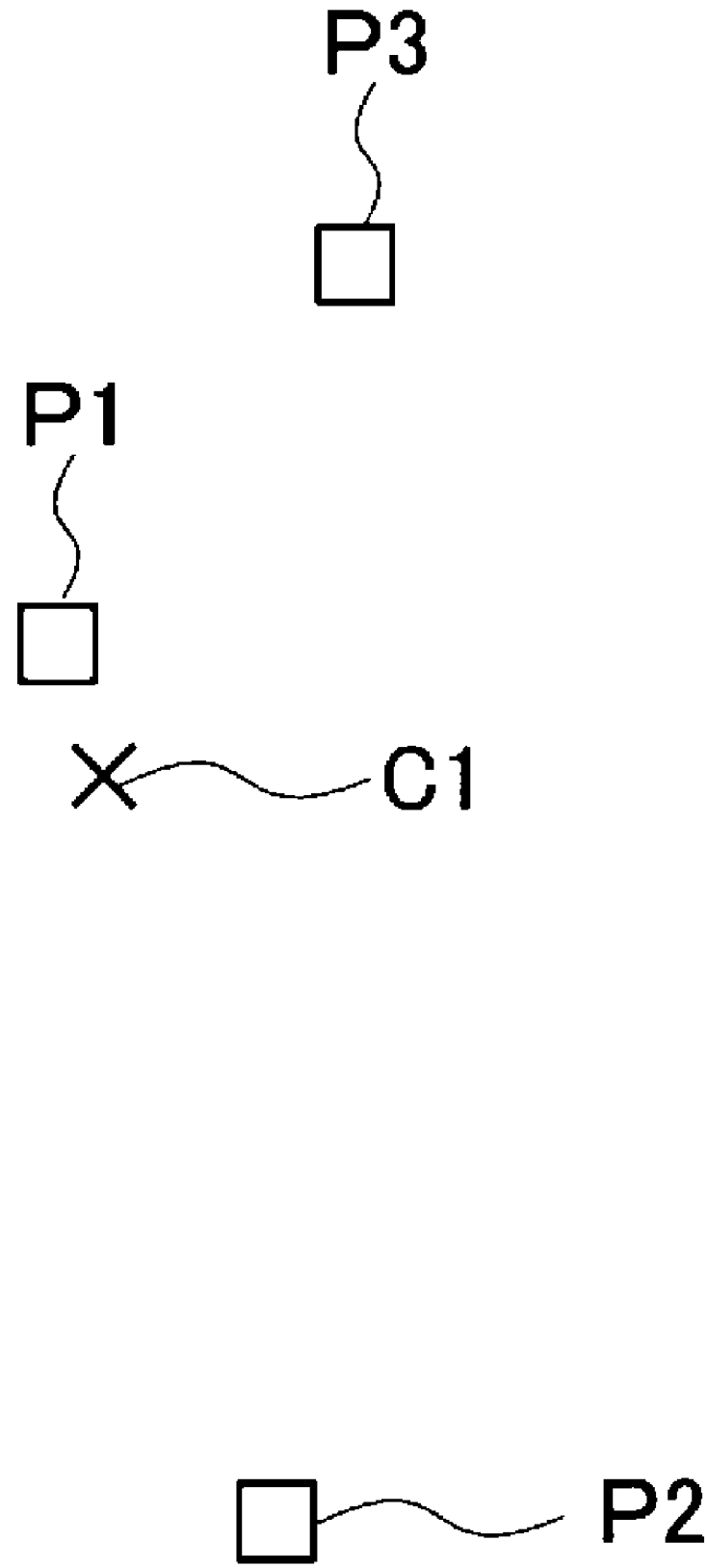
FIG. 7 is a diagram (part 2) illustrating a method for calculating an effectiveness in the index calculation unit of the device.

Alternatively, an effectiveness of a cluster in a current cycle may be calculated according to distances between a centroid of the cluster in the current cycle to be processed and centroids of a plurality of clusters in a previous cycle. FIG. 7 illustrates centroids P1, P2, and P3 of clusters in a previous cycle and a centroid C1 of a cluster in a current cycle, for example. The effectiveness of the cluster in the current cycle is calculated such that the effectiveness of a cluster in the previous cycle having a centroid that is close in distance to the centroid C1 is strongly reflected and the effectiveness of a cluster in the previous cycle having a centroid that is distant from the centroid C1 is weakly reflected. In the example illustrated in FIG. 7, the effectiveness of the cluster having the centroid C1 is calculated from the effectiveness of each of the clusters having centroids P1, P2 and P3 so as to be strongly affected by the effectiveness of the cluster in the previous cycle having the centroid P1 that is close in distance to the centroid C1 and is weakly affected by the effectiveness of the cluster in the previous cycle having the centroid P2 that is distant from the centroid C1.

The index calculation unit 24 may, for example, calculate an effectiveness of a cluster in a current cycle on the basis of a weight negatively correlated with a distance between a position of a centroid of the cluster in the current cycle and a position of a centroid of the cluster in the previous cycle. Specifically, the index calculation unit 24 may repeat, for each cluster in the previous cycle, processing of multiplying the effectiveness of the cluster in the previous cycle by an inverse of the distance between the position of the centroid of the cluster in the current cycle and the position of the centroid of the cluster in the previous cycle and may sum up values obtained in each processing operation to obtain the effectiveness of the cluster in the current cycle. In this case, for calculating the effectiveness of the cluster in the current cycle, the index calculation unit 24 may calculate the effectiveness of the cluster in the current cycle from the effectiveness of each cluster in the previous cycle or may calculate the effectiveness of the cluster in the current cycle from, among each cluster in the previous cycle, the effectiveness of each cluster within a predetermined range from the cluster in the current cycle to be calculated. As a result, it is possible to appropriately correct the effectiveness of the cluster in the current cycle in consideration of a difference in the centroid between the cluster in the previous cycle and the cluster in the current cycle.

The index calculation unit 24 calculates diversity β for each sample in order to determine samples to be extracted from each cluster. Diversity β is calculated to be higher as a distance between a sample and a centroid of a cluster to which the sample belongs increases. The distance used here is calculated by means of a shape-based distance (SBD). The index calculation unit 24 calculates, for example, an inverse of a distance between a sample and a centroid of a cluster to which the sample belongs as diversity β.

Figure 8:
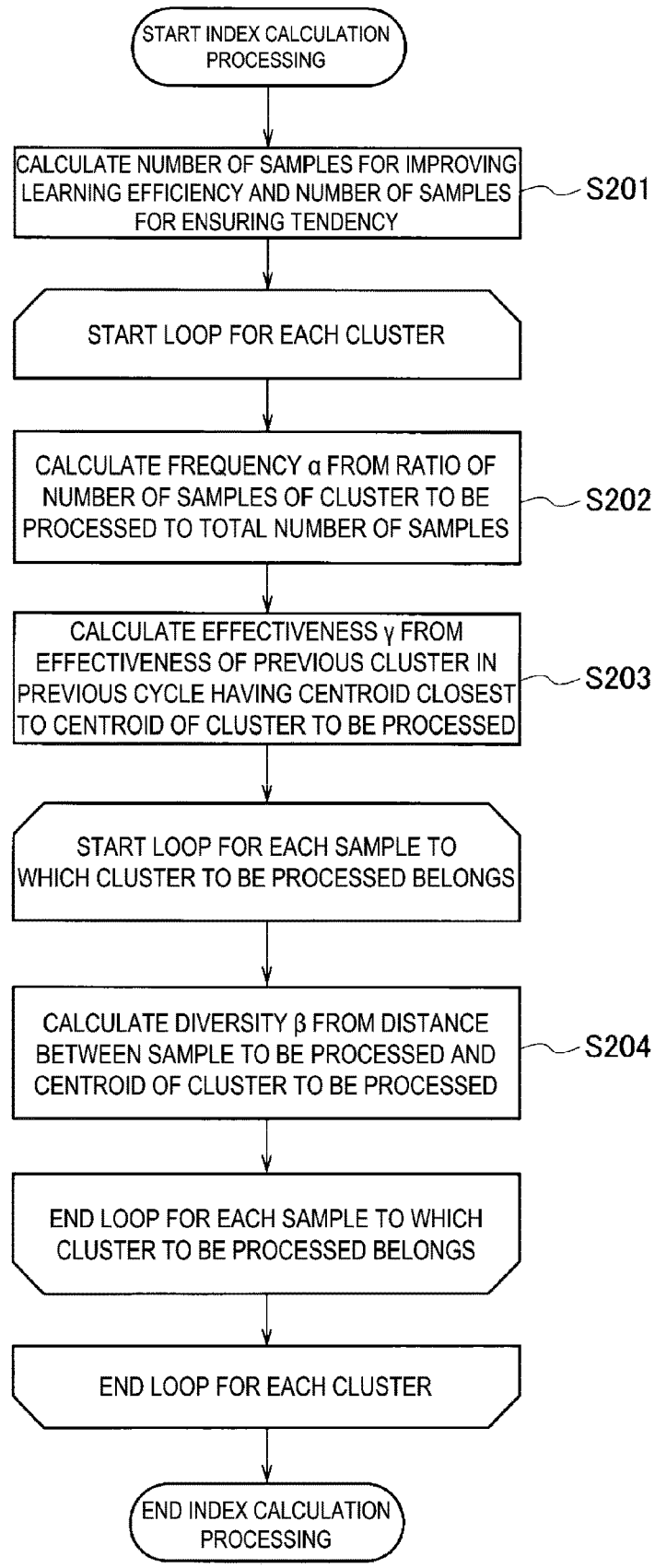
FIG. 8 is a flowchart illustrating index calculation processing by the index calculation unit of the device.

With reference to FIG. 8, index calculation processing performed by the index calculation unit 24 will be described.

At Step S201, the index calculation unit 24 calculates the number of samples for enhancing learning efficiency and the number of samples for ensuring tendency.

Then, the processing operations of Steps S202 to S204 are repeated for each cluster. At Step S202, the index calculation unit 24 calculates frequency $\alpha$ of a cluster to be processed from a ratio of the number of samples belonging to the cluster to be processed to the number of previous samples. At Step S203, the index calculation unit 24 calculates effectiveness $\gamma$ of the cluster to be processed from an effectiveness of a cluster in the previous cycle having a centroid closest to a centroid of the cluster to be processed. Note that the calculation method of effectiveness $\gamma$ illustrated in FIG. 8 is an example, and various calculation methods are conceivable, such as correcting by a distance from a centroid of a cluster in the previous cycle or calculating from pieces of effectiveness of a plurality of clusters in the previous cycle.

The index calculation unit 24 performs the processing of Step S204 for each sample belonging to the cluster to be processed. At Step S204, the index calculation unit 24 calculates diversity $\beta$ from a distance between the sample to be processed and a centroid of the cluster to be processed. The calculation is performed such that a value of diversity $\beta$ is higher as the distance from the centroid increases.

When the processing of Step S204 for each sample belonging to the cluster to be processed is completed, the processing operations of Steps S202 to S204 are repeated for other clusters. After the processing operations of Steps S202 to S204 have been repeated for each cluster, the index calculation unit 24 ends the processing.

Based on an index indicated by index data 14, the extraction unit 25 extracts samples from each cluster with reference to the sample data 12 and the cluster data 13. The extraction unit 25 performs first sampling processing to extract samples for enhancing learning efficiency and second sampling processing to extract samples for ensuring tendency. The extraction unit 25 generates extraction data 15 that identifies samples extracted in the first sampling processing and in the second sampling processing. The extraction data 15 identifies the extracted samples and also identifies the identifier of the cluster to which the samples belong.

The extraction unit 25 calculates importance for each cluster in the first sampling processing to extract more samples from clusters having higher importance and extract less samples from clusters having lower importance. The importance is positively correlated with frequency $\alpha$ or effectiveness $\gamma$. The importance may be frequency $\alpha$ or effectiveness $\gamma$, or may be a composite index of frequency $\alpha$ and effectiveness $\gamma$. The importance is calculated, for example, by adding or multiplying the frequency $\alpha$ and effectiveness $\gamma$, multiplying a square root of the frequency $\alpha$ by the effectiveness $\gamma$, or the like. In the first sampling processing, the number of samples obtained by multiplying the total number of samples to be transmitted to the learning apparatus 2 by $\varepsilon$ is extracted.

In a case where the importance is effectiveness $\gamma$, the extraction unit 25 extracts samples from each of the plurality of clusters according to the effectiveness of each cluster received from the learning apparatus 2. The extraction unit 25 extracts samples from each cluster with reference to effectiveness $\gamma$ of each cluster of the index data 14. As described with regard to the index calculation unit 24, effectiveness $\gamma$ used here may be the effectiveness of each cluster received from the learning apparatus 2 or may be an effectiveness calculated by correcting the effectiveness of each cluster. More samples are extracted from clusters with higher effectiveness $\gamma$, and fewer samples are extracted from clusters with lower effectiveness $\gamma$. The extraction unit 25 specifies the number of samples to be extracted from each cluster according to a ratio of effectiveness $\gamma$.

The extraction unit 25 extracts the specified number of samples from each cluster. When samples are extracted from a certain cluster, each sample has diversity $\beta$ negatively correlated with a distance to a centroid of a cluster to which the sample belongs as a weight. In the extraction unit 25, samples which are more distanced from the centroid of the cluster, specifically samples having higher diversity $\beta$, have a higher probability of being extracted from the cluster, and samples which are closer to the centroid of the cluster, specifically samples having lower diversity $\beta$, have a lower probability of being extracted from the cluster. Thus, by extracting the samples using diversity $\beta$ negatively correlated with the distance to the centroid of the cluster as a weight, the diversity of samples extracted from the cluster is ensured.

Figure 9:
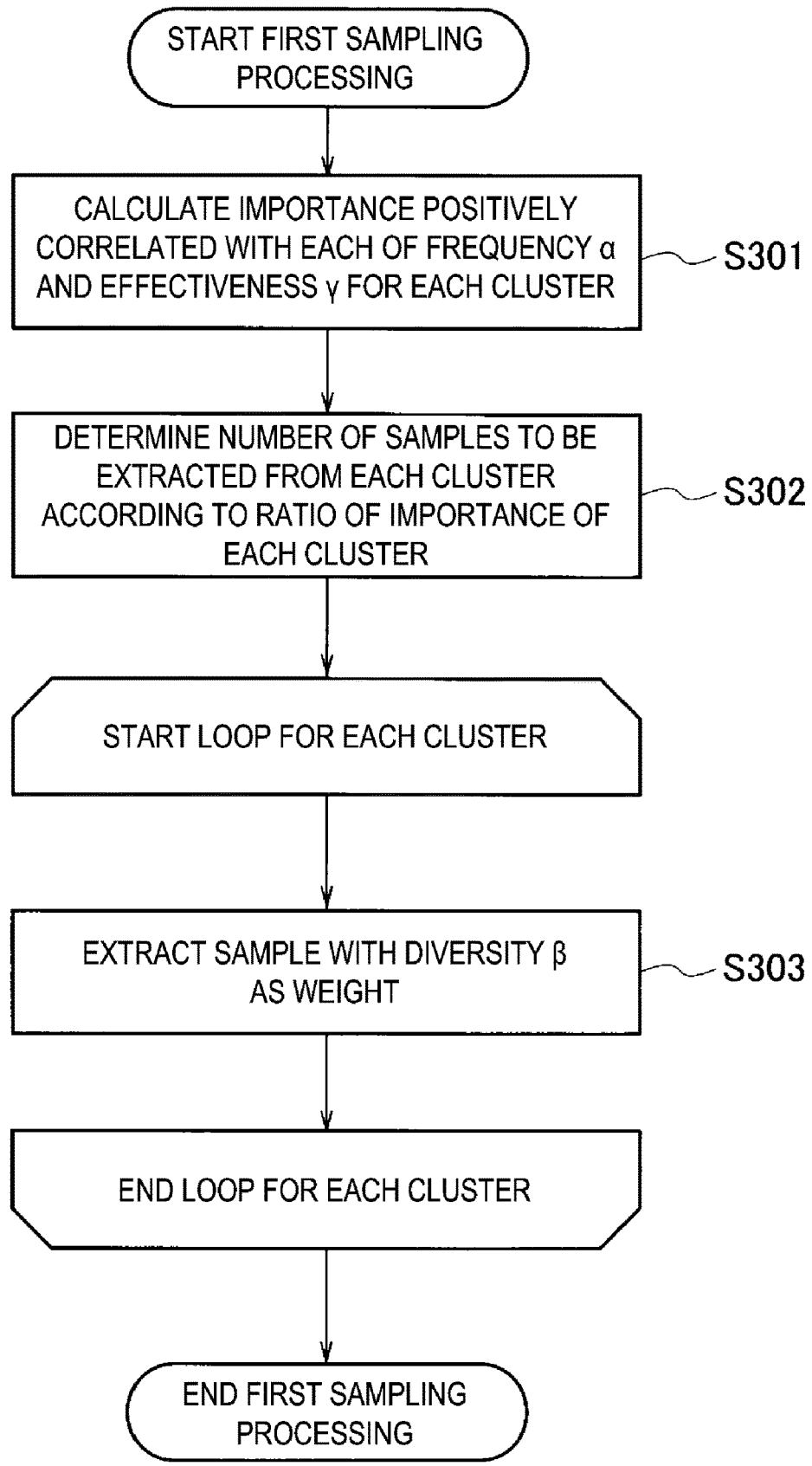
FIG. 9 is a flowchart illustrating first sampling processing by an extraction unit of the device.

With reference to FIG. 9, the first sampling processing performed by the extraction unit 25 will be described. Here, a case where the importance of cluster is calculated from frequency $\alpha$ and effectiveness $\gamma$ will be described.

First, at Step S301, the extraction unit 25 calculates the importance for each cluster. This importance is positively correlated with each of the frequency $\alpha$ and the effectiveness $\gamma$. At Step S302, the extraction unit 25 determines the number of samples to be extracted from each cluster according to the ratio of the importance of each cluster calculated at Step S301.

The processing of Step S303 is repeated for each cluster. The extraction unit 25 extracts, for a cluster to be processed, samples to be transmitted among samples belonging to the cluster to be processed using diversity $\beta$ of each sample as a weight. The number of samples to be extracted here is the number of samples calculated at Step S302 for the cluster to be processed. When the processing of Step S303 for each cluster is completed, the first sampling processing is ended.

In the first sampling processing, since the samples are extracted for the purpose of enhancing learning efficiency, the tendency of the samples to be extracted in the first sampling processing may differ from the tendency of the samples acquired by the acquisition unit 22. Thus, in the second sampling processing, the extraction unit 25 extracts new samples from each cluster such that a distribution of samples to be transmitted to the learning apparatus 2 coincides with a tendency of the samples acquired by the acquisition unit 22. The distance between the distributions is calculated, for example, by means of the earth mover's distance. In the second sampling processing, the number of samples obtained by multiplying the total number of samples to be transmitted to the learning apparatus 2 by $(1-\varepsilon)$ is extracted. In the second sampling processing, the extraction unit 25 selects, for example by a greedy algorithm, the number of samples obtained by multiplying the total number of samples to be transmitted to the learning apparatus 2 by $(1-\varepsilon)$ one by one.

Figure 10:
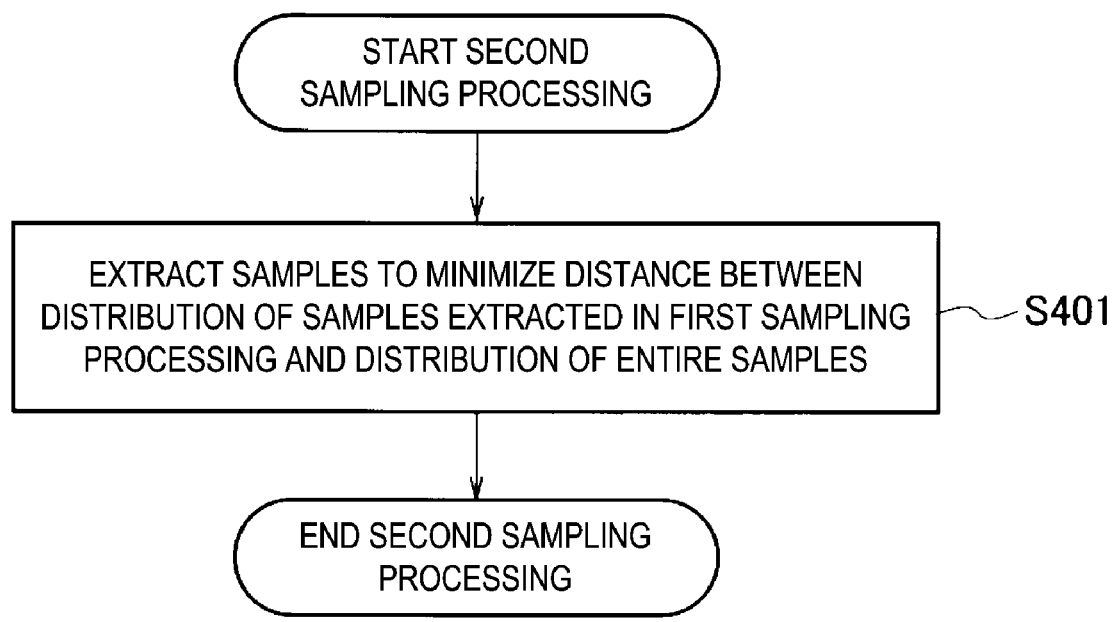
FIG. 10 is a flowchart illustrating second sampling processing by the extraction unit of the device.

With reference to FIG. 10, the second sampling processing performed by the extraction unit 25 will be described.

At Step S401, the extraction unit 25 extracts samples to be transmitted such that a distance between a distribution of samples extracted in the first sampling processing and a distribution of samples acquired by the acquisition unit 22 is minimized. The extraction unit 25 ends the processing after the number of samples obtained by multiplying the total number of samples to be transmitted to the learning apparatus 2 by $(1-\varepsilon)$ is extracted.

The transmission unit 26 transmits the extracted samples to the learning apparatus 2. The transmission unit 26 transmits data of each sample identified by the extraction data 15 to the learning apparatus 2.

Learning Apparatus

Figure 11:
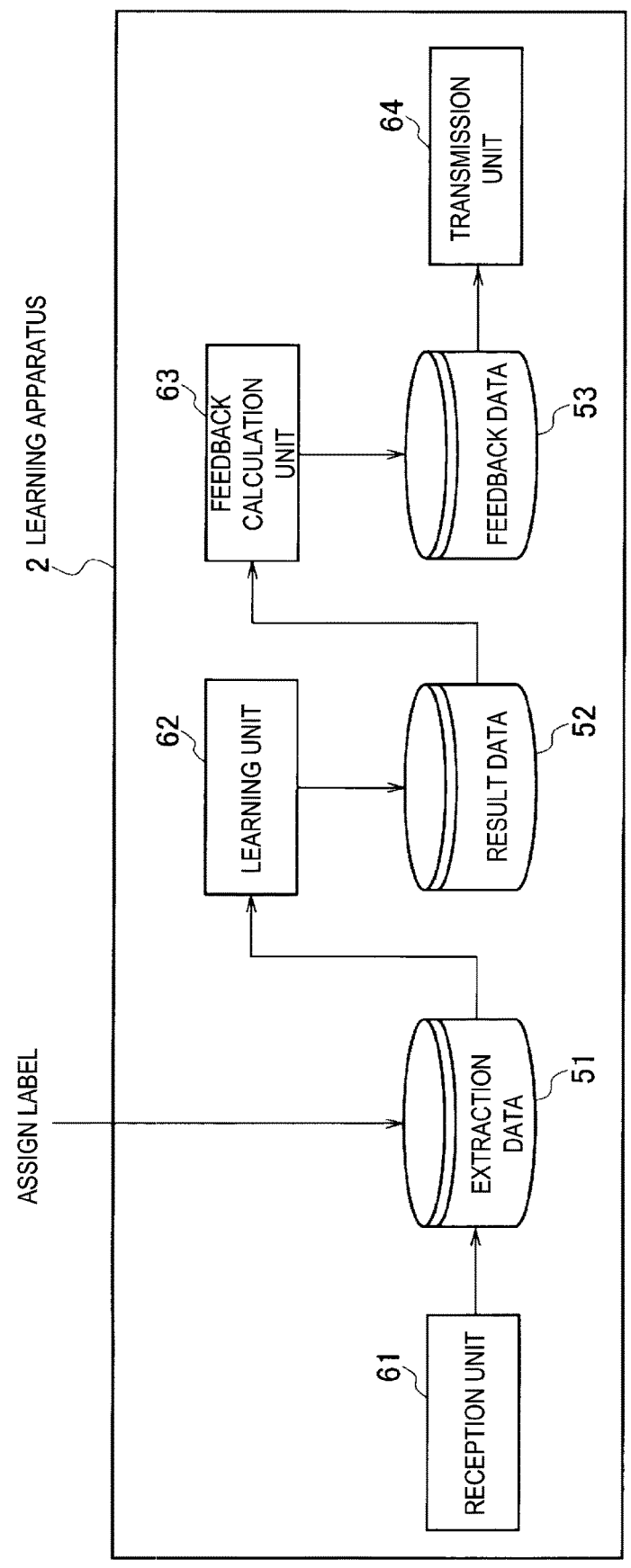
FIG. 11 is a functional block diagram of a learning apparatus used in the learning system.

With reference to FIG. 11, the learning apparatus 2 according to the embodiment of the present disclosure will be described. The learning apparatus 2 stores extraction data 51, result data 52, and feedback data 53. The learning apparatus 2 includes a reception unit 61, a learning unit 62, a feedback calculation unit 63, and a transmission unit 64. The functions illustrated in FIG. 3 are implemented by a computer executing a program for executing processing operations.

The reception unit 61 receives data of samples extracted from each cluster from a device 1 and stores the received data in the extraction data 51. Here, the reception unit 61 receives data of samples from each of a plurality of devices 1 and stores the data in the extraction data 51. The extraction data 51 identifies each sample transmitted from each device 1.

Any one of a plurality of types of labels is assigned to the samples extracted by the device 1 by means of any method. For example, when the learning apparatus 2 generates a learning model that classifies samples into three types, a label of any one of the three types is assigned to each sample identified by the extraction data 51. In a case where the samples are heartbeat data, a doctor who is an operator may assign a label indicating whether each sample is irregular heartbeat. Alternatively, the samples extracted by the device 1 may be labeled by a software using a predetermined algorithm.

The learning unit 62 learns samples extracted by the device 1. The learning unit 62 generates a learning model by learning, as an input, the extraction data 51 to which the label has been assigned as correct answer data. A discriminator implemented by the learning unit 62 is, for example, a convolutional neural network (CNN).

The learning unit 62 further uses the learning model generated by learning the samples extracted by the device 1 to calculate a probability of the sample extracted by the device 1 being correspondent to each of the plurality of types of labels. The learning unit 62 calculates a ratio of correspondence to each label using the generated learning model for each sample identified by the extraction data 51. For example, in a case where there are correct answer labels A, B, and C, the learning unit 62 calculates, for each sample identified by the extraction data 51, a probability of being labeled as A, a probability of being labeled as B, and a probability of being labeled as C. The learning unit 62 calculates, for example, "a probability of being A: 40%, a probability of being B: 35%, a probability of being C: 25%" for a certain sample or calculates "a probability of being A: 90%, a probability of being C: 10%" for another sample. The learning unit 62 stores the probability of each label for each sample in the result data 52.

Figure 12:
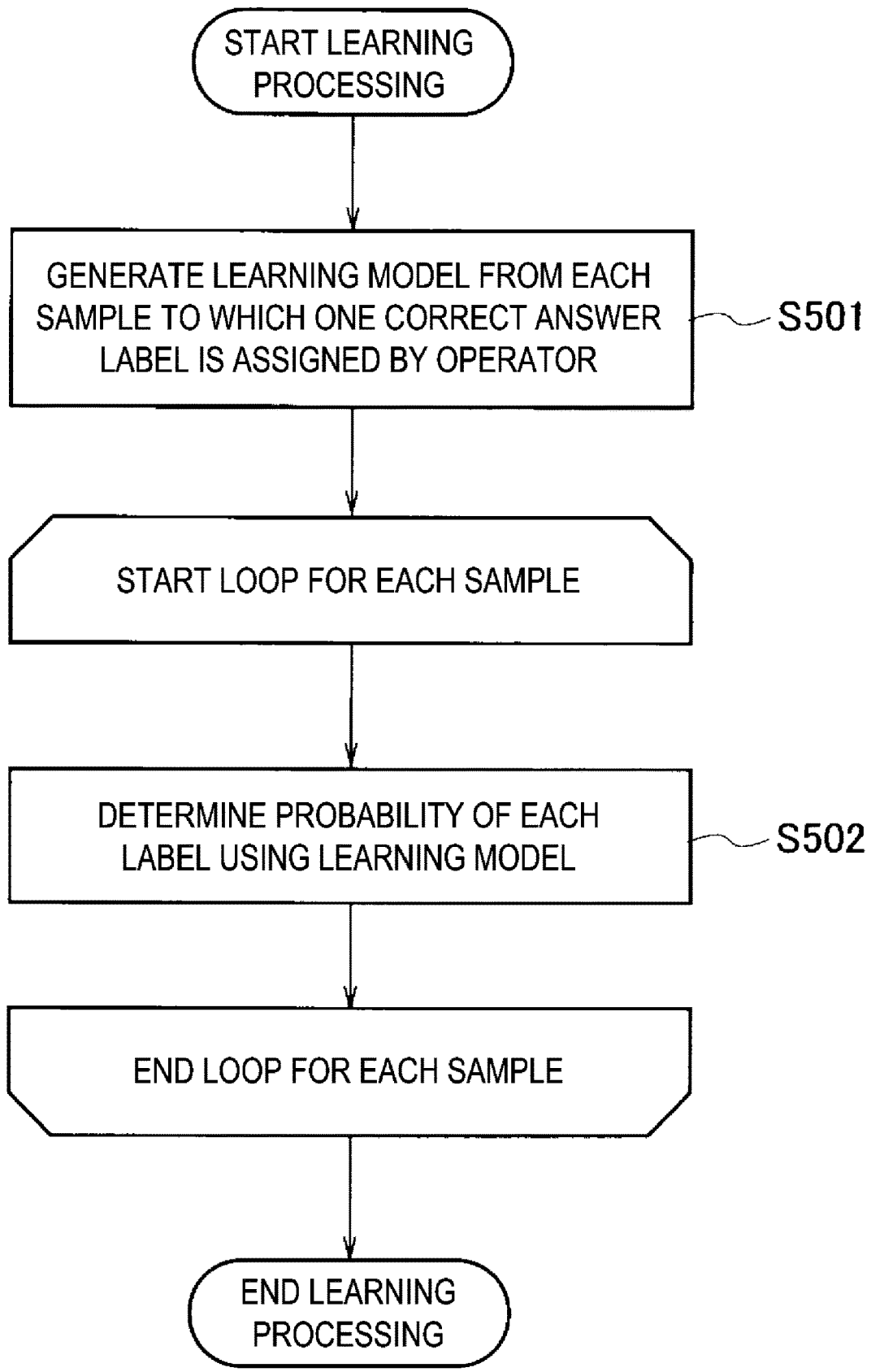
FIG. 12 is a flowchart illustrating learning processing by a learning unit of the learning apparatus.

With reference to FIG. 12, learning processing performed by the learning unit 62 will be described.

At Step S501, the learning unit 62 generates a learning model from each sample to which one correct answer label has been assigned by the operator.

For each sample identified by the extraction data 51, the processing of Step S502 is repeated. At Step S502, the learning unit 62 determines, for the samples to be processed, the probability of being correspondent to each label. When the processing of Step S502 for each sample identified by the extraction data 51 is completed, the learning unit 62 ends the processing.

With reference to the result data 52, the feedback calculation unit 63 calculates an effectiveness in learning the samples belonging to the cluster for each cluster, and a ratio ε. The feedback calculation unit 63 generates feedback data 53 to be transmitted to the device 1. The feedback data 53 is generated for each device 1 that is a destination of transmission and includes the effectiveness of each cluster and the ratio ε.

The feedback calculation unit 63 calculates an effectiveness for each sample and calculates an average of the effectiveness of the samples belonging to each cluster as the effectiveness of that cluster. Methods for calculating the effectiveness of each sample includes a calculation method that increases an effectiveness of a cluster having larger number of samples to which special labels are assigned, and a calculation method that increases an effectiveness of a cluster having larger number of samples for which it is difficult to identify labels by learning.

First, the calculation method that increases an effectiveness of a cluster having larger number of samples to which special labels are assigned will be described. The feedback calculation unit 63 calculates an effectiveness of a cluster by counting, for each type of label assigned by an operator, the number of samples to which the label is assigned and calculating, for each cluster, the effectiveness of the cluster to be larger for fewer number of samples having the label assigned to the samples belonging to the cluster. For example, the feedback calculation unit 63 calculates, for each sample belonging to the cluster, an index that increases for fewer number of samples having the label assigned to the sample and calculates an average of the indices of the samples belonging to the cluster as the effectiveness of the cluster.

Next, the calculation method that increases an effectiveness of a cluster having larger number of samples for which it is difficult to identify labels by learning will be described. The feedback calculation unit 63 calculates, for each cluster, an effectiveness of the cluster to be larger for less degree of variation in the probability of being correspondent to each label for the samples belonging to the cluster. For example, the feedback calculation unit 63 calculates, for each sample belonging to the cluster, an index that increases for less degree of variation in the probability of being correspondent to each label and calculates an average of the indices of the samples belonging to the cluster as the effectiveness of the cluster. The degree of variation may be, for the samples to be processed, a degree of variation in the probability of each label type, or a degree of variation in the probability between the label types assigned by the operator and a predetermined number of label types having higher probability among the label types other than the label types assigned by the operator, or may be obtained by other calculation methods.

Assume that sample X has "a probability of being A: 40%, a probability of being B: 35%, a probability of being C: 25%", and sample Y has "a probability of being A: 90%, a probability of being C: 10%". Since data around the sample X is a sample at a boundary portion that is difficult for the learning model to identify, the effect of labeling is large for such a sample. Therefore, the feedback calculation unit 63 calculates, for each sample, an index based on a difference between the ratio determined by the learning model for the label to which the operator has assigned the correct answer and the ratio of the label having the highest probability determined by the learning model among the labels other than the label to which the operator has assigned the correct answer. For example, an index of 1−0.4+0.35=0.95 is calculated for sample X, and an index of 1−0.9+0.1=0.2 is calculated for sample Y. The feedback calculation unit 63 calculates an effectiveness for each sample so as to be proportional to such an index, and the device 1 extracts a larger number of samples of clusters having higher effectiveness, and then the number of samples of a boundary portion that are difficult for the learning model to identify can be increased. As a result, the learning system 5 can generate a learning model that can make determination more appropriately.

The feedback calculation unit 63 may calculate the effectiveness of each cluster from the effectiveness calculated by means of each of the aforementioned two calculation methods. The effectiveness calculated by means of the calculation method that increases an effectiveness of a cluster having a larger number of samples to which special labels are assigned is set as a first parameter. The effectiveness calculated by means of the calculation method that increases an effectiveness of a cluster having a larger number of samples for which it is difficult to identify labels by learning is set as a second parameter. The feedback calculation unit 63 calculates a parameter positively correlated with each of the first parameter and the second parameter as the effectiveness. For example, the feedback calculation unit 63 calculates an average of the first parameter and the second parameter of a cluster as the effectiveness of the cluster.

The feedback calculation unit 63 further calculates ratio ε. Ratio ε is an average effectiveness calculated for samples extracted by the device 1. Ratio ε may also be corrected to have the same balance as the average effectiveness calculated for devices 1, such as twice the average effectiveness, rather than the average effectiveness. Since ratio ε is calculated to be higher for a device from which a larger number of effective samples have been extracted, the device 1 can contribute to enhancement in learning efficiency by increasing the ratio of samples for increasing efficiency.

Ratio ε may be adjusted depending on the characteristics of the device 1. For example, ratio ε is adjusted to be larger for a newly installed device 1. Since samples of the newly installed device 1 have not yet been sufficiently learned by the learning unit 62, demand of sampling for enhancing learning efficiency is high. Meanwhile, ratio ε is reduced for a device 1 for which a considerable time has elapsed since installation. Since maturity of learning by the learning unit 62 is higher for samples of the device 1 for which a considerable time has elapsed since installation, demand of sampling for enhancing learning efficiency is reduced, and thus ratio ε is adjusted to be smaller.

Figure 13:
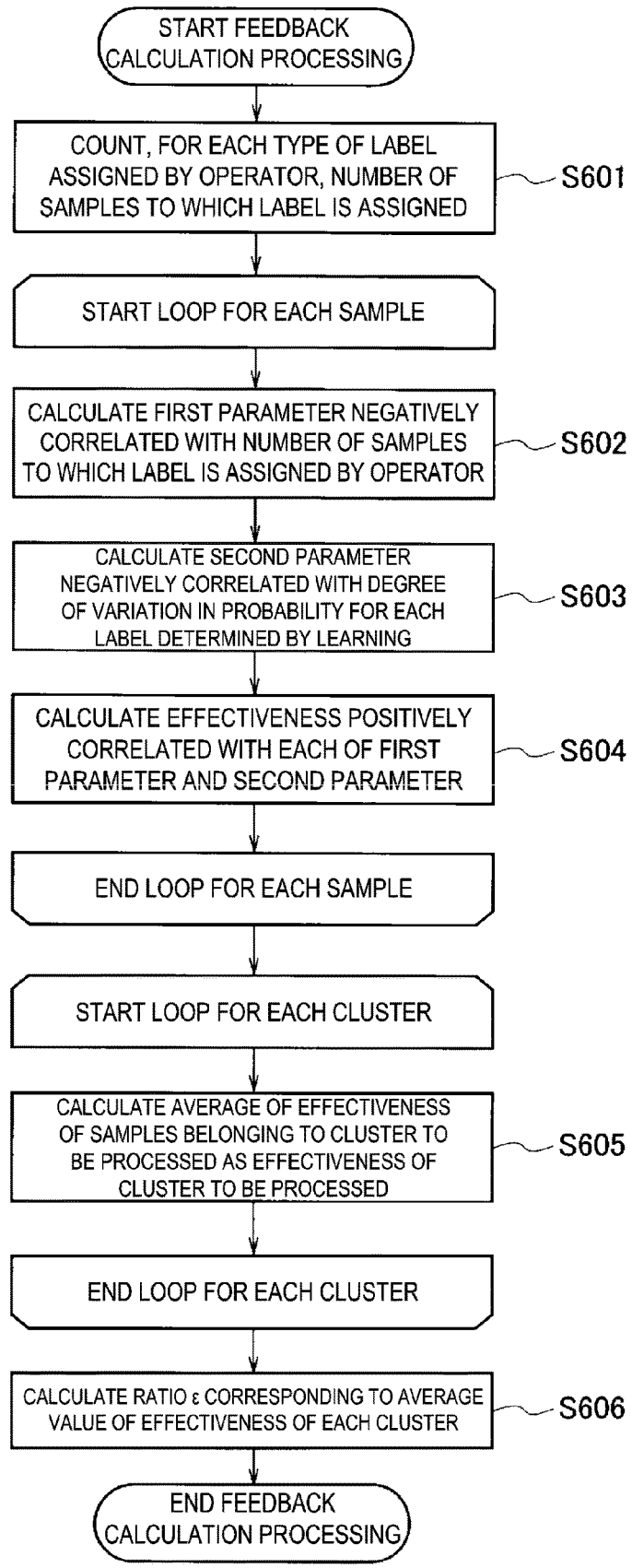
FIG. 13 is a flowchart illustrating feedback calculation processing by a feedback calculation unit of the learning apparatus.
Figure 14:
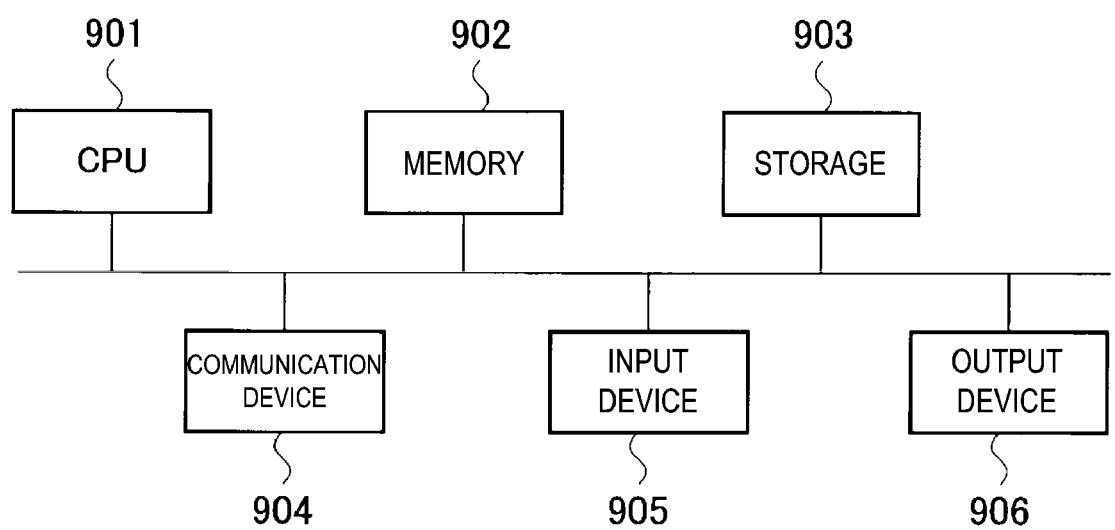
FIG. 14 is a diagram illustrating a hardware configuration of a computer used in the device or the learning apparatus.

With reference to FIG. 13, feedback processing performed by the feedback calculation unit 63 will be described. Calculation of effectiveness from parameters calculated by each of the calculation method that increases an effectiveness of a cluster having a larger number of samples to which special labels are assigned and the calculation method that increases an effectiveness of a cluster having a larger number of samples for which it is difficult to identify labels by learning will be described here.

First, at Step S601, the feedback calculation unit 63 counts, for each type of label assigned by the operator, the number of samples to which the label is assigned. Next, for each sample transmitted by the device 1, the processing operations of Steps S602 to S604 are repeated.

At Step S602, the feedback calculation unit 63 calculates, for the samples to be processed, a first parameter negatively correlated with the number of samples to which the operator has assigned the same label as the label assigned to the samples to be processed by the operator. At Step S603, the feedback calculation unit 63 calculates a second parameter negatively correlated with the degree of variation in the probability of each label identified by learning. At Step S604, the feedback calculation unit 63 calculates an effectiveness positively correlated with the first parameter calculated at Step S602 and positively correlated with the second parameter calculated at Step S603.

When the processing operations of Steps S602 to S604 for each sample are completed, processing of Step S605 is performed for each cluster. Each cluster is each cluster formed by the device 1.

At Step S605, the feedback calculation unit 63 calculates an average of the effectiveness of each sample belonging to the cluster to be processed as an effectiveness of the cluster to be processed. When the processing of Step S605 for each cluster is completed, the processing proceeds to Step S606.

At Step S606, the feedback calculation unit 63 calculates ratio ε of the device 1 to which the feedback data 53 is transmitted. The feedback calculation unit 63 calculates ratio ε from the average effectiveness of each sample calculated at Step S604. The feedback calculation unit 63 may adjust the calculated ratio ε based on, for example, time having elapsed from installation of the device 1.

The transmission unit 64 transmits the feedback data 53 to the device 1. The feedback data 53 includes the effectiveness of each cluster and the ratio ε. The feedback data 53 transmitted by the transmission unit 64 is referenced when samples are extracted by the device 1 in a next cycle.

According to the embodiment of the present disclosure, the learning apparatus 2 gives an effectiveness γ of each cluster to the device 1 such that more samples that play efficient roles in learning by the learning apparatus 2 are selected, and the device 1 extracts the number of samples proportional to the effectiveness γ from each cluster. This results in lower effectiveness of a cluster having samples to which larger number of labels are assigned by the operator and higher effectiveness of a cluster having samples to which smaller number of labels are assigned by the operator. The learning apparatus 2 can collect and learn more samples to which a smaller number of labels are assigned.

When the samples are identified using the learning model generated by the learning apparatus 2, the effectiveness is higher for a cluster to which samples having smaller variation of the probability for labels and being difficult to identify belongs. The learning apparatus 2 can collect and learn more samples located at boundary portions that are difficult to identify.

When samples are extracted from each cluster by the device 1, samples farther from a centroid of the cluster, specifically, samples having higher diversity are more easily extracted. In addition, since typically a large number of samples tend to gather in the vicinity of the centroid of the cluster, samples can be extracted from the entire cluster.

In addition, in the embodiment of the present disclosure, the learning apparatus 2 not only collects samples that are effective for learning, but also acquires a group of samples having a distribution similar to that of samples acquired by the device 1. In a case where the learning apparatus collects only samples that are effective for learning, the learning apparatus 2 can achieve both collecting samples that are effective for learning and collecting samples that form a distribution similar to that of samples collected by the device 1, even when a deviation occurs in the distribution of the samples transmitted to the learning apparatus.

In addition, the learning apparatus 2 also provides, to the device 1, appropriate feedback for extracting samples. Accordingly, in the learning system 5, the device 1 can extract samples and the learning apparatus 2 can learn the extracted samples.

As each of the device 1 and the learning apparatus 2 of the present embodiment described above, a general-purpose computer system is used. The general-purpose computer system includes a central processing unit (CPU) (a processor) 901, a memory 902, a storage 903 (a hard disk drive (HDD) or a solid state drive (SSD)), a communication device 904, an input device 905, and an output device 906. In this computer system, the CPU 901 executes a predetermined program loaded in the memory 902 to implement each function of the device 1 and to implement each function of the learning apparatus 2.

Note that each of the device 1 and the learning apparatus 2 may be implemented on one computer or may be implemented on a plurality of computers. Still alternatively, each of the device 1 and the learning apparatus 2 may be a virtual machine implemented on a computer.

Each program for the device 1 and the learning apparatus 2 may be stored in a computer-readable recording medium such as a HDD, a SSD, a universal serial bus (USB) memory, a compact disc (CD), or a digital versatile disc (DVD) or may be distributed via a network.

The present disclosure is not limited to the above embodiment, and various modification may be made within the scope of its gist.

REFERENCE SIGNS LIST

1 Device
2 Learning apparatus
3 Communication network
5 Learning system
6 Sensor
11, 53 Feedback data
12 Sample data
13 Cluster data
14 Index data
15, 51 Extraction data
21, 61 Reception unit
22 Acquisition unit
23 Clustering unit
24 Index calculation unit
25 Extraction unit
26, 64 Transmission unit
52 Result data
62 Learning unit
63 Feedback calculation unit
901 CPU
902 Memory
903 Storage
904 Communication device
905 Input device
906 Output device

The invention claimed is:

1. A learning method comprising the steps of:
acquiring, by a device, a plurality of samples;
dividing, by the device, the plurality of samples into a plurality of clusters;
extracting, by the device, samples from each of the plurality of clusters according to an effectiveness of each of the plurality of clusters received from a learning apparatus, wherein a number of samples extracted from the each of the plurality of clusters is proportional to the effectiveness of the each of the plurality of clusters;
transmitting, by the device, the extracted samples to the learning apparatus;
learning, by the learning apparatus, the extracted samples;
calculating, by the learning apparatus, for each of the plurality of clusters, an effectiveness in learning samples of the extracted samples belonging to a cluster of the plurality of clusters from learning results; and
transmitting, by the learning apparatus, the effectiveness of each of the plurality of clusters to the device.

2. The learning method according to claim 1, wherein
any one label out of a plurality of types of labels is assigned to each of the extracted samples, and
the step of calculating includes the steps of:
counting, for each of the plurality of types of labels assigned to the extracted samples, the number of samples where the label is assigned, and
calculating, for each of the plurality of clusters, the effectiveness of the cluster to be larger when the number of samples having the label assigned to the samples belonging to the cluster is small.

3. The learning method according to claim 1, wherein the step of learning includes the steps of:
calculating, for the extracted samples, probabilities corresponding to each of the plurality of types of labels using a learning model generated by learning the extracted samples, and
calculating, for each of the plurality of clusters, the effectiveness of the cluster to be larger when a degree of variation of the probabilities corresponding to each of the plurality of labels for the samples belonging to the cluster is small.

4. The learning method according to claim 1, wherein
in the step of extracting of the samples, samples farther from a centroid of the cluster have higher probability of being extracted from the cluster.

5. The learning method according to claim 1, wherein
a plurality of cycles having from the step of-acquiring of the plurality of samples to the step of-transmitting of the effectiveness for each of the plurality of clusters to the device as one cycle are repeated,
the effectiveness of each of the plurality of clusters received from the learning apparatus is an effectiveness of each of a plurality of clusters in a previous cycle, and
the step of extracting of the sample includes the steps of:
associating the plurality of clusters in the previous cycle with a corresponding plurality of clusters identified in a current cycle based on centroids of clusters, and
extracting samples from each of the plurality of clusters according to the effectiveness of a cluster of the plurality of clusters in the previous cycle corresponding to a cluster of the plurality of clusters identified in the current cycle.

6. The learning method according to claim 2, wherein in the step of extracting of the samples, samples farther from a centroid of the cluster have higher probability of being extracted from the cluster.

7. The learning method according to claim 3, wherein in the step of extracting of the samples, samples farther from a centroid of the cluster have higher probability of being extracted from the cluster.

8. The learning method according to claim 2, wherein
a plurality of cycles having from the step of acquiring of the plurality of samples to the step of transmitting of the effectiveness for each of the plurality of clusters to the device as one cycle are repeated, the effectiveness of each of the plurality of clusters received from the learning apparatus is an effectiveness of each of a plurality of clusters in a previous cycle, and the step of extracting of the sample includes the steps of:
associating the plurality of clusters in the previous cycle with a corresponding plurality of clusters identified in a current cycle based on centroids of clusters, and
extracting samples from each of the plurality of clusters according to the effectiveness of a cluster of the plurality of clusters in the previous cycle corresponding to a cluster of the plurality of clusters identified in the current cycle.

9. The learning method according to claim 3, wherein a plurality of cycles having from the step of acquiring of the plurality of samples to the step of transmitting of the effectiveness for each of the plurality of clusters to the device as one cycle are repeated, the effectiveness of each of the plurality of clusters received from the learning apparatus is an effectiveness of each of a plurality of clusters in a previous cycle, and the step of extracting of the sample includes the steps of:
associating the plurality of clusters in the previous cycle with a corresponding plurality of clusters identified in a current cycle based on centroids of clusters, and
extracting samples from each of the plurality of clusters according to the effectiveness of a cluster of the plurality of clusters in the previous cycle corresponding to a cluster of the plurality of clusters identified in the current cycle.

10. The learning method according to claim 4, wherein a plurality of cycles having from the step of acquiring of the plurality of samples to the step of transmitting of the effectiveness for each of the plurality of clusters to the device as one cycle are repeated, the effectiveness of each of the plurality of clusters received from the learning apparatus is an effectiveness of each of a plurality of clusters in a previous cycle, and the step of extracting of the sample includes the steps of:
associating the plurality of clusters in the previous cycle with a corresponding plurality of clusters identified in a current cycle based on centroids of clusters, and
extracting samples from each of the plurality of clusters according to the effectiveness of a cluster of the plurality of clusters in the previous cycle corresponding to a cluster of the plurality of clusters identified in the current cycle.

11. A device comprising:
a processor; and
a memory device storing instructions that, when executed by the processor, configure the processor to:
acquire a plurality of samples;
divide the plurality of samples into a plurality of clusters;
extract samples from each of the plurality of clusters according to a ratio of an effectiveness of each of the plurality of clusters received from a learning apparatus, wherein a number of samples extracted from the each of the plurality of clusters is proportional to the effectiveness of the each of the plurality of clusters; and
transmit the extracted samples to the learning apparatus.

12. A learning apparatus comprising:
a processor; and
a memory device storing instructions that, when executed by the processor, configure the processor to:
learn samples extracted by the device of claim 11;
calculate, per clusters basis, the plurality of clusters being obtained by clustering the samples by the device, an effectiveness in learning the samples belonging to a cluster of the clusters from learning results; and
transmit the effectiveness of each of the clusters to the device.

13. A non-transitory computer readable medium storing a program, wherein executing of the program causes a computer to operate as the device according to claim 11.

14. A non-transitory computer readable medium storing a program, wherein executing of the program causes a computer to operate as the learning apparatus according to claim 12.

* * * * *